W. A. NASH.
DEVICE FOR EXTRACTING AUTOMOBILES FROM MUD, SAND, OR DITCHES.
APPLICATION FILED OCT. 13, 1919.
1,340,238. Patented May 18, 1920.
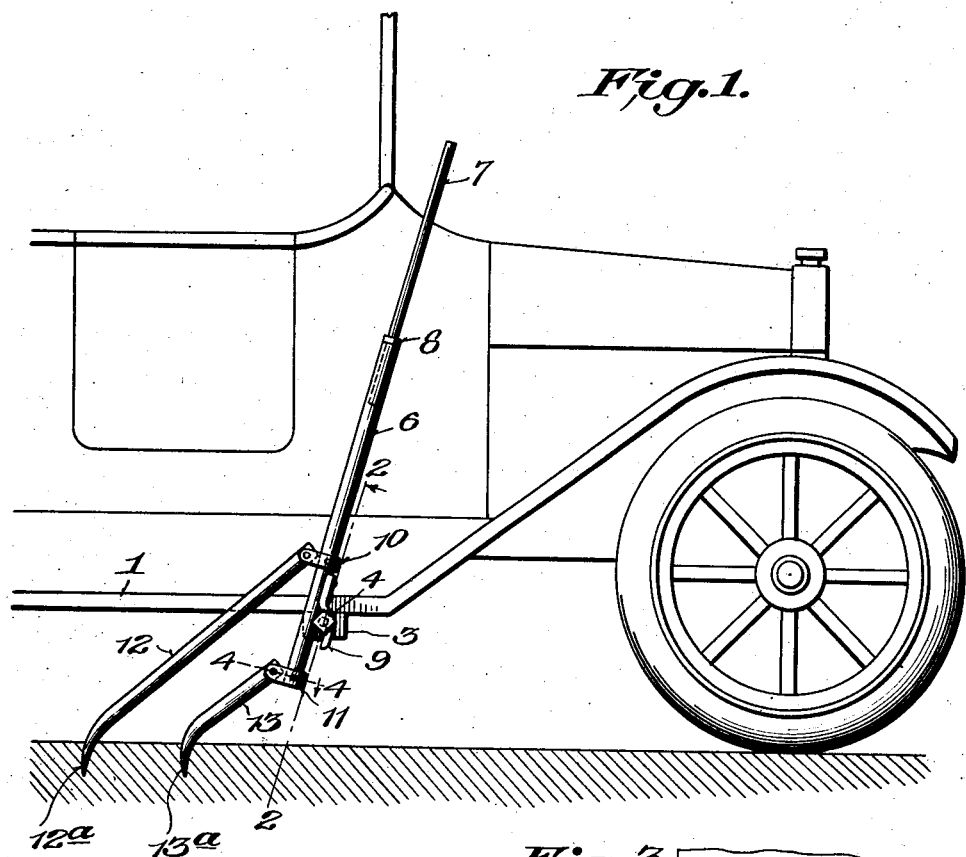
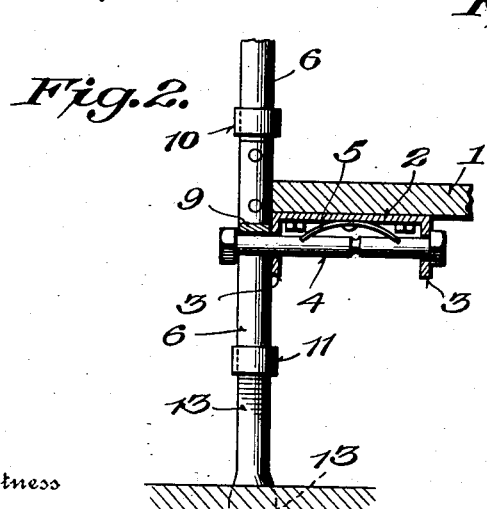
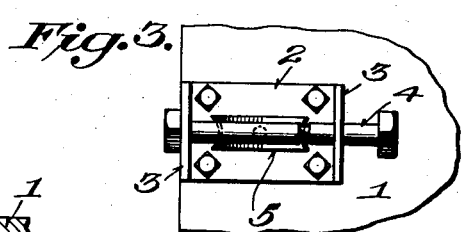
Inventor
W. A. Nash,
By William B. Jaynes,
Attorney

UNITED STATES PATENT OFFICE.

WILLIAM A. NASH, OF PLAINVIEW, TEXAS.

DEVICE FOR EXTRACTING AUTOMOBILES FROM MUD, SAND, OR DITCHES.

1,340,238.

Specification of Letters Patent.

Patented May 18, 1920.

Application filed October 13, 1919. Serial No. 330,297.

*To all whom it may concern:*

Be it known that I, WILLIAM A. NASH, citizen of the United States, residing at Plainview, in the county of Hale and State of Texas, have invented certain new and useful Improvements in Devices for Extracting Automobiles from Mud, Sand, or Ditches, of which the following is a specification.

This invention relates to a readily portable, and easily applied device for extracting automobiles from mud, sand, or ditches.

The invention comprises a telescoping lever having pivoted foot portions adapted to engage the ground and successively lift and advance the vehicle until it is clear of the obstruction. It can be applied to either side of the vehicle and is reversible, so that the vehicle can be moved either forward or backward, and is operable from the driver's seat.

With this object in view the invention consists in the novel features of construction hereinafter described, pointed out in the claims and shown in the accompanying drawings, in which:—

Figure 1 is a side elevation of the forward portion of an automobile having my invention applied thereto in position for use.

Fig. 2 is a vertical section on the line 2—2 of Fig. 1.

Fig. 3 is an inverted plan view of a bolt retaining plate.

Fig. 4 is a section on the line 4—4 of Fig. 1.

In the drawing 1 designates the running board of an automobile. On the underside of this is secured a plate 2 having end flanges 3, and held by said flanges is a bolt 4, slidable longitudinal in the flanges and held against rattling by a spring 5. When pushed outwardly, as in Fig. 2, the bolt forms a fulcrum for the operating lever.

For convenience of storage in the automobile I form the operating lever in sections, comprising a tube 6 which receives a rod 7. The rod is provided with a collar 8 adjacent one end of the rod which limits its telescoping movement into the tube 6, the tube serving as a portion of the lever and also as a holder for the upper rod section.

Adjacent its lower end the tube 6 has on one side a downwardly open hook 9 adapted to fit over the projecting portion of the bolt 4. Above the hook is a bracket 10 and at the lower end of the tube 6 is a bracket 11.

Arms 12 and 13 are pivoted respectively to these brackets, and the arms terminate in claw feet, 12ª and 13ª.

It will be understood that a plate 2 and bolt 4 will be placed on each running board, so that the device above described can be applied to either side of the vehicle.

By reversing the device the lever can be applied on either front or rear side of the bolt, thereby forcing the automobile either forward or backward.

When the device is not in use it is carried in the automobile with the longer portion of the rod 7 telescoped in the tube. When it is to be used, the rod is withdrawn, reversed and the other end inserted in the tube, thereby increasing the length of the lever, the bolt is drawn outwardly, the hook engaged with it, and the lever worked back and forth. The claw feet are pushed into the ground where they will secure a good grip, and the vehicle lifted and pushed either forwardly or rearwardly, depending on the manner in which the device is engaged with the bolt 4.

The bolt forms a fulcrum for the turning movement of the lever, and as one claw foot is holding the other is advancing to take a new grip, and the vehicle is thus urged continuously forward. By means of this device a wheel can be readily lifted or forced from a deep rut, mud hole, or ditch or the vehicle forced out of deep sand.

The device is simple and durable, and requires no gears, chains or posts, and has the further advantage that it can be applied and put into use without the driver dismounting.

What I claim is:—

1. In a device of the kind described, a lever, a hook member thereon, pivoted arms having foot portions carried by the lever, and means carried by a vehicle and forming a fulcrum for said hook member.

2. The combination with the running board of an automobile, a spring pressed, longitudinally slidable bolt carried transversely by the under side of the running board, a lever having a lateral hook member adapted to engage said bolt when pushed outwardly, and arms pivotally connected to the lever and adapted to engage the ground.

3. The combination with an automobile, of a bolt transversely and slidably carried by the under side of the running board, a tubular lever, an extension rod adapted to telescope in the lever, a hook carried by one side of the lever adapted to engage the bolt, and pivoted arms carried by the lever and adapted to engage the ground.

4. In a device of the kind described, a tubular lever, a rod adapted to fit in the lever and having a collar adjacent one end, a hook member adjacent the lower end of the lever, and arms having foot portions, said arms being pivotally connected to said lever and on opposite sides of said hook member, as and for the purpose set forth.

In testimony whereof I affix my signature.

WILLIAM A. NASH.